| (12) | United States Patent | (10) Patent No.: | US 9,688,211 B2 |
|---|---|---|---|
| | Schierk et al. | (45) Date of Patent: | Jun. 27, 2017 |

(54) ROOF BAR FOR A MOTOR VEHICLE

(71) Applicant: AUDI AG, Ingolstadt (DE)

(72) Inventors: Sebastian Schierk, Schrobenhausen (DE); Michael Schäfer, Wettstetten (DE); Christian Bürger, Ingolstadt (DE); Simon Streibel, Ingolstadt (DE)

(73) Assignee: Audi AG, Ingolstadt (DE)

( * ) Notice: Subject to any disclaimer, the term of this patent is extended or adjusted under 35 U.S.C. 154(b) by 134 days.

(21) Appl. No.: 14/760,669

(22) PCT Filed: Dec. 20, 2013

(86) PCT No.: PCT/EP2013/003882
§ 371 (c)(1),
(2) Date: Jul. 13, 2015

(87) PCT Pub. No.: WO2014/108161
PCT Pub. Date: Jul. 17, 2014

(65) Prior Publication Data
US 2015/0353023 A1 Dec. 10, 2015

(30) Foreign Application Priority Data
Jan. 14, 2013 (DE) .................. 10 2013 000 460

(51) Int. Cl.
B60R 9/058 (2006.01)
(52) U.S. Cl.
CPC .................... B60R 9/058 (2013.01)
(58) Field of Classification Search
CPC . B60R 9/045; B60R 9/04; B60R 9/052; B60J 7/057

USPC ......................................................... 224/329
See application file for complete search history.

(56) References Cited

U.S. PATENT DOCUMENTS

| 2,940,652 A | 6/1960 | Willard | |
| 5,862,964 A * | 1/1999 | Moliner | B60R 9/058 224/322 |
| 9,038,874 B2 * | 5/2015 | Poulsen | B60R 9/058 224/329 |

(Continued)

FOREIGN PATENT DOCUMENTS

| CH | 318683 | 2/1957 |
| CN | 101746320 | 6/2010 |

(Continued)

OTHER PUBLICATIONS

International Search Report issued by the European Patent Office in International Application PCT/EP2013/003882.

(Continued)

*Primary Examiner* — Adam Waggenspack
(74) *Attorney, Agent, or Firm* — Henry M. Feiereisen, LLC

(57) ABSTRACT

A roof bar for a motor vehicle, includes a support structure for a roof bar element with an fastening claw which engages at a first end on a side wall rail of a vehicle body and is connected in an articulated fashion to a clamping lever. The fastening claw is guided in a guide in the support structure and a leaf spring is provided which, on one side, engages on the clamping lever-in the region of its free end and, on the other side, is supported on the support structure, wherein when the clamping lever is pressed down towards the attachment claw the-fastening claw is clamped on the side wall rail by the spring force.

9 Claims, 4 Drawing Sheets

(56) References Cited

U.S. PATENT DOCUMENTS

2010/0192704 A1* 8/2010 Flaherty ................. B60R 9/058
73/862.21

FOREIGN PATENT DOCUMENTS

| DE | 3340137 A1 | 5/1985 |
| DE | 3432067 A1 | 3/1986 |
| DE | 60102620 T2 | 3/2005 |
| WO | WO2011/089373 | 7/2011 |

OTHER PUBLICATIONS

Chinese Search Report issued on Jun. 23, 2016 with respect to counterpart Chinese patent application 201380064880.2.
Translation of Chinese Search Report issued on Jun. 23, 2016 with respect to counterpart Chinese patent application 201380064880.2.

* cited by examiner

ROOF BAR FOR A MOTOR VEHICLE

CROSS-REFERENCES TO RELATED APPLICATIONS

This application is the U.S. National Stage of International Application No. PCT/EP2013/003882, filed Dec. 20, 2013, which designated the United States and has been published as International Publication No. WO 2014/108161 and which claims the priority of German Patent Application, Serial No. 10 2013 000 460.8, filed Jan. 14, 2013, pursuant to 35 U.S.C. 119(a)-(d).

BACKGROUND OF THE INVENTION

The invention relates to a roof bar for a motor vehicle.

Roof bars for vehicles of the generic type are known in numerous variations. They are used for transporting loads on the vehicle roof and are designed as so-called clamping carriers. Usually, two clamping carriers are provided on the vehicle roof, one facing the vehicle front and one facing the vehicle rear, and which may also be referred to as carrier bridge. The roof bars are secured by special clamping carrier feet or clamping claws, which can be clamped to the vehicle's side-panel frame. Many different constructions are used as clamping mechanisms. Well-known mechanisms which are tensioned via levers or eccentrics have the disadvantage that they do not provide tolerance compensation in the case of rigid levers and an additional component is required to establish clamping tension.

From DE 33 40 137 A1, a clampable luggage rack is known, which includes a support structure for a roof bar in the form of a support leg and is secured by a clamp to a roof drip molding of the vehicle roof. The clamp is pivotally connected to a pivot arm via a pivot bolt, which pivot arm is itself pivotally connected to the support leg via a bearing pin. Additionally, a two-armed lever is provided to be able to remove and secure the swivel arm in the manner of a push button. Tolerances of the sidewall rail are not compensated.

From CH 318683 a ski rack is known which has a tensioning-lever lock, for fastening to a roof drip molding on the vehicle roof, which tensioning-lever lock has a spring clip made of wire for effecting the tensioning.

The object of the invention is to provide a roof bar for a motor vehicle, which is simple in construction and easily operated by hand, wherein a good fastening to the sidewall rail of the vehicle is ensured.

SUMMARY OF THE INVENTION

According to the invention, this object is achieved by providing a roof bar for a motor vehicle having the features of the independent claim. Advantageous embodiments and refinements of the invention are set forth in the dependent claims.

Embodiments of the roof bar according to the invention include a new clamping and tensioning mechanism which advantageously enables a tolerance compensation of the sidewall rail's geometry so that the clamping tension can be maintained approximately constant over an entire tolerance range.

Embodiments of the present invention provide a roof bar for a motor vehicle, which includes a support structure for a roof bar element, including a fastening claw which, on a first end, engages on the sidewall rail of the vehicle body and is pivotally connected to a clamping lever. According to the invention, in the region of its second end the fastening claw is guided in the support structure in a guide and a leaf spring is provided, which on one side engages on the clamping lever in the region of the free end of the clamping lever and on the other side is supported on the support structure, wherein pushing down of the clamping lever towards the fastening claw causes clamping of the fastening claw to the sidewall rail as a result of the spring force.

The movable arrangement of the fastening claw in its guide of the support structure together with the leaf spring, creates a compensatory component, which enables compensating tolerances of the sidewall rail's geometry so that the final clamping tension can be maintained almost constant over an entire tolerance range. Moreover, the operating forces for pushing down the clamping lever can be reduced so as to enable an easy one-hand-operation.

In an advantageous embodiment of the roof bar, bearing brackets are provided on the clamping lever and on the fastening claw for pivotal connection between fastening claw and clamping lever, which bearing brackets receive a shaft which is movably received on the guide in the support structure. With this, a connection between both components as well as a connection to the support structure is achieved in a simple manner.

In a further advantageous embodiment of the roof bar, the fastening claw is guided at its second end in the support structure in a second guide. This allows an additional connection of the fastening claw to the support structure which results in a particularly safe and durable clamping.

In a further advantageous embodiment of the roof bar, the two guides are designed in a simple manner as longitudinal slots in opposing legs of the support structure.

In a further advantageous embodiment of the roof bar, a particularly simple support results when the second end of the fastening claw has pins which are received in the longitudinal slots of the second guide.

In a further advantageous embodiment of the roof bar, a reliable and simple connection of the leaf spring to the clamping lever results by providing a clamping lever shaft which is received in bearing brackets on the clamping lever.

In a further advantageous embodiment of the roof bar, a simple and reliable connection of the leaf spring to the support structure results by providing a spring shaft between the legs of the support structure.

In a further advantageous embodiment of the roof bar, the fastening claw has an opening for receiving the shaft of the clamping lever in its depressed state. With this, a durable, reliable closing of the clamping lever is ensured in a simple manner without further need of supplementary components.

In a further advantageous embodiment of the roof bar a good power transmission from the roof bar element to the vehicle roof results, when the support structure has two profile elements in U-shape that are connected to each other. It is hereby advantageous to provide the support structure with a base component that rests against the vehicle roof.

BRIEF DESCRIPTION OF THE DRAWING

Advantageous embodiments of the invention are illustrated in the drawing and are described below. It is shown in.

DETAILED DESCRIPTION OF PREFERRED EMBODIMENTS

Figure 1:
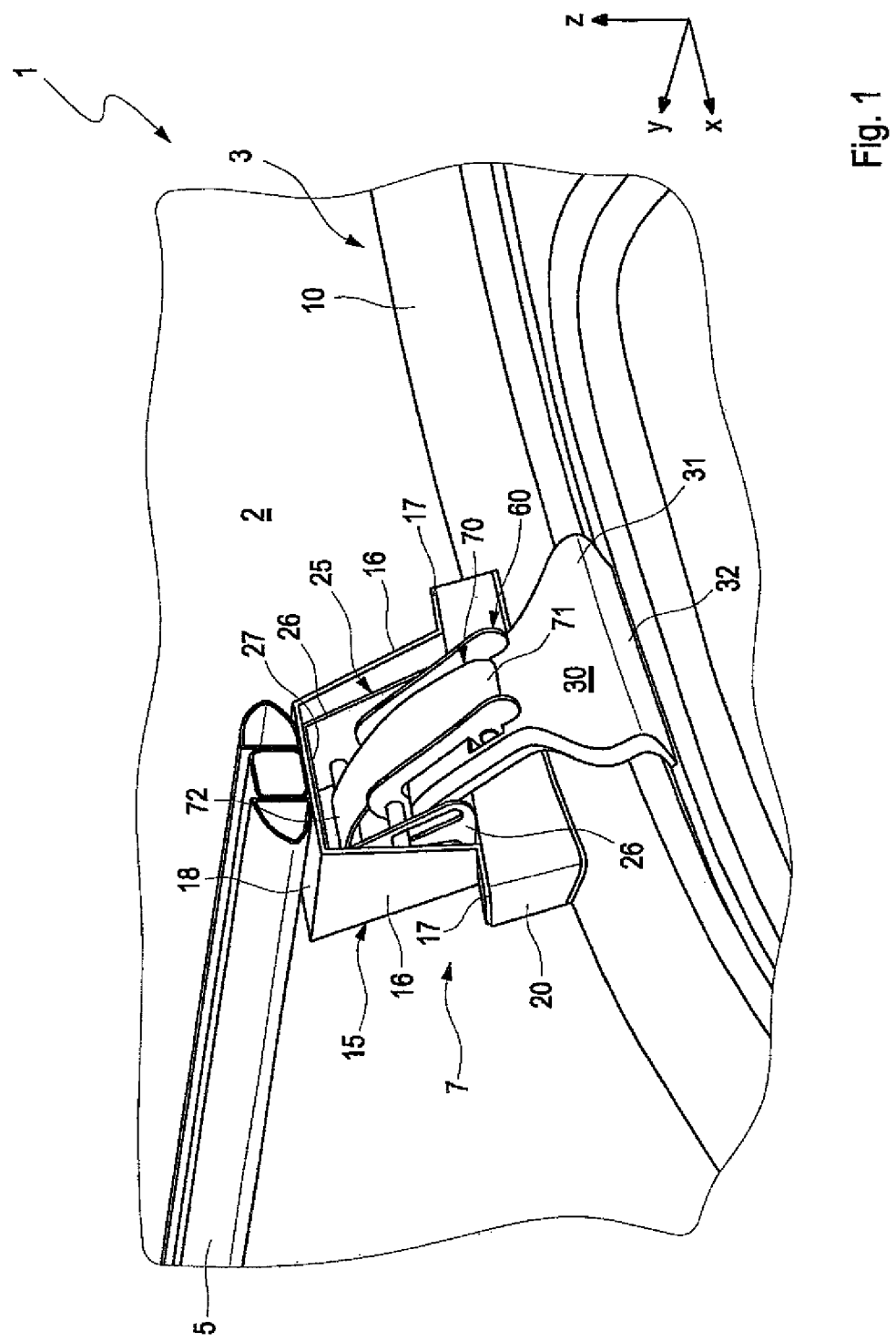
FIG. 1 a schematic perspective view of an exemplary embodiment of a roof bar for a motor vehicle according to the invention in closed position which is attached to a vehicle roof, FIG. 2 a perspective view of the roof bar of in FIG. 1 without vehicle roof in a semi-closed position, FIG. 3 a perspective view of the roof bar of in FIG. 1 without vehicle roof in an open position, FIG. 4 a perspective view of the roof bar of in FIG. 1 without vehicle roof in a closed position.

FIG. 1 shows a roof bar 1 for a vehicle in the closed position, which is mounted on a vehicle roof 2 and is provided in a known manner for receiving loads or luggage, such as skis or the like. For this, usually two roof bars 1, one facing the vehicle front and one facing the vehicle rear, are fastened to the vehicle roof 2.

Each roof bar 1 has a roof bar element 5, which extends over the vehicle roof in transverse direction y and which is only partially shown in FIGS. 1 to 4 and in the exemplary embodiment is formed as a hollow section. The roof bar element 5 is attached to the vehicle roof 2 on a sidewall rail 10 or on a side panel frame of a vehicle body 3 via two opposing support structures 7. For this purpose, the support structures 7 respectively have a first outer U-shaped profile element 15, which has two legs 16, each with a support leg 17 and a connecting element 18. The U-shape of the first profile element 15 is formed by the two legs 16 and the connecting element 18 which connects the two legs 16 and extends parallel to the vehicle roof 2. The outer profile element 15 is respectively supported with one support leg on a rectangular-shaped base element 20, which rests on the vehicle roof 2. Within the first profile element 15 a second profile element 25 is provided which is also U-shaped. The U-shape of the second profile element 25 is formed by two legs 26 and a second connecting element 27 that connects the two legs 26 and extends parallel to the vehicle roof 2. The two legs 26 project from the base element 20. A connection between both profile elements 15, 25 can be achieved via the two connecting elements 18, 27 that are situated above each other. Preferably the first profile element 15 and the second profile element 25 are made of sheet metal. The roof bar element 5 is supported on the first connecting element 17 of the first profile element 15 and thus transmits the weight received on the roof bar element via the support legs 17 and the base element 20 to the vehicle roof 2. The support structure 7 shown in the exemplary embodiment is formed by the first profile element 15, the second profile element 25 and the base element 20.

A fastening claw 30 is pivotally connected with the support structure 7 or the second profile element 25. This fastening claw 30 engages with its first end 31 on the sidewall rail 10 or the side penal frame, for which purpose an angled portion 32 is constructed on the fastening claw 30. As shown in FIG. 1, the angled portion 32 engages directly on the sidewall rail 10 or on the side panel frame. However, it is also possible for the angled portion 32 to engage on a roof drip molding on the sidewall rail 10.

Figure 2:
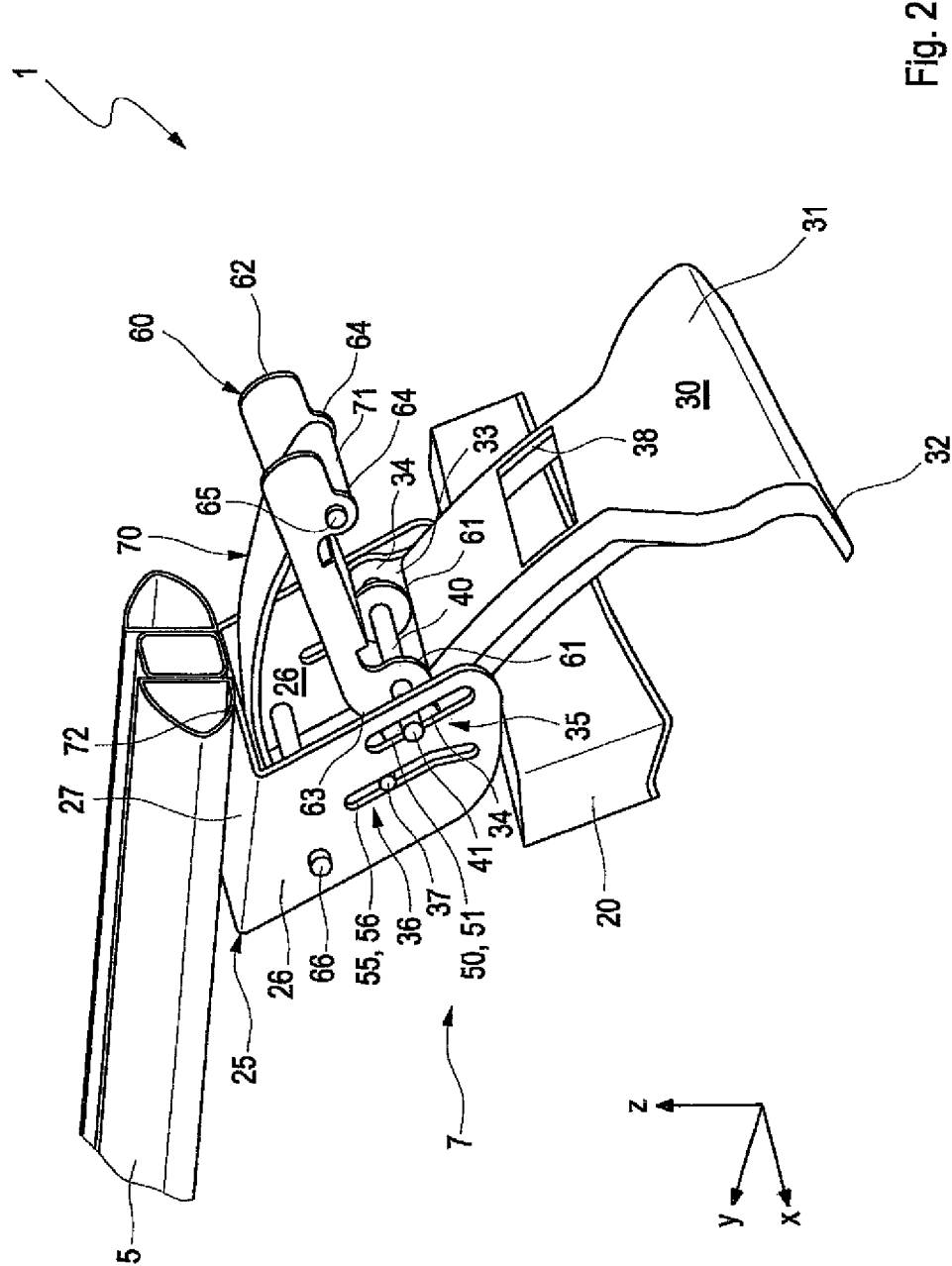
Figure 3:
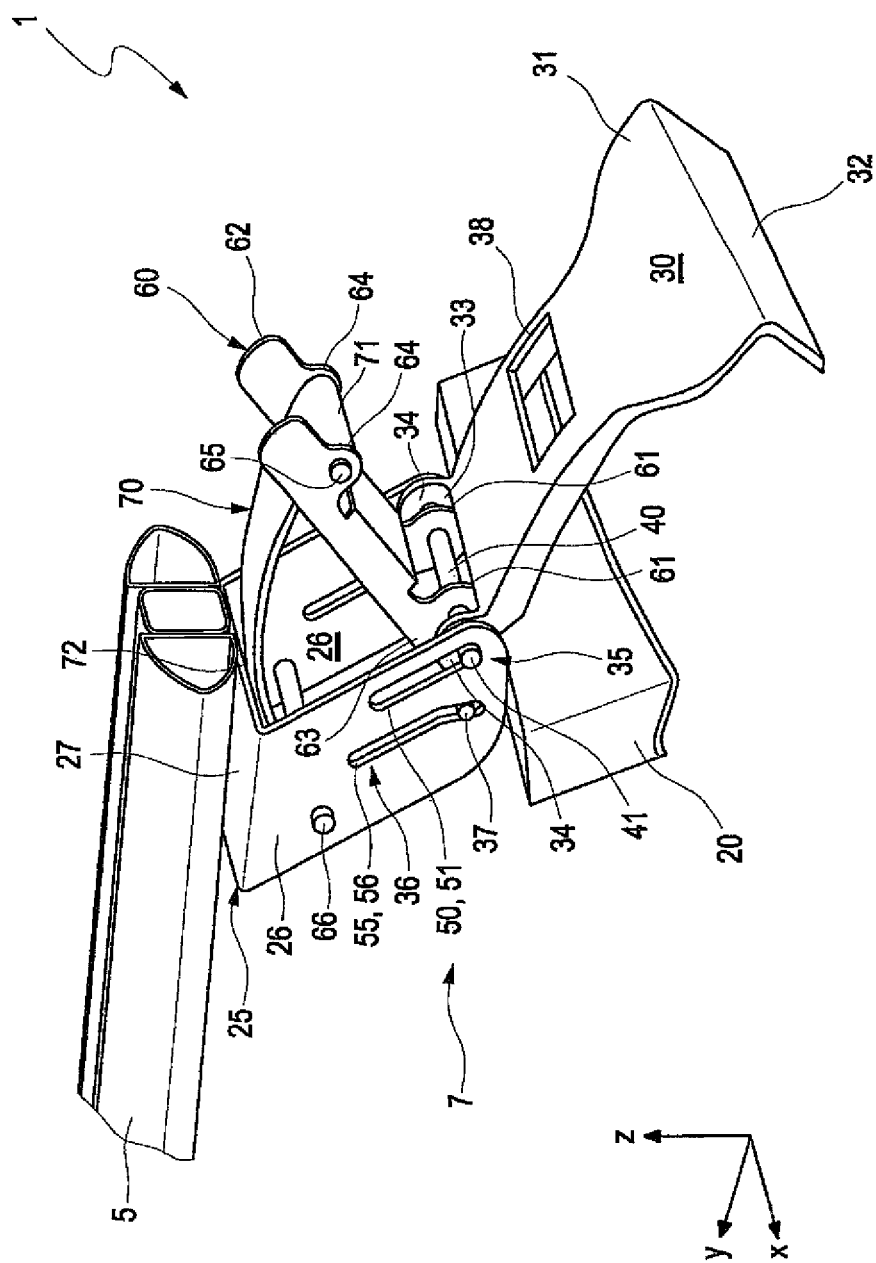
Figure 4:
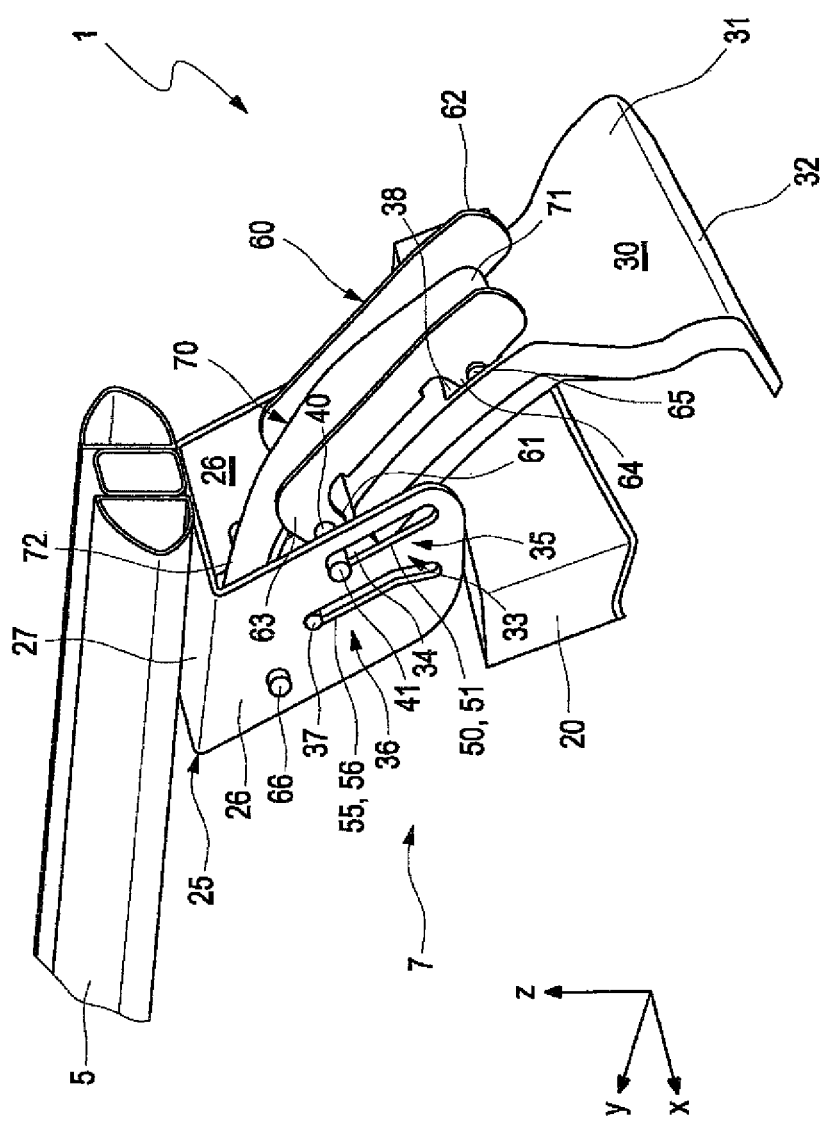

In order to better illustrate the roof bar 1, the roof bar 1 is shown without the first profile element 15 in FIGS. 2 to 4.

In contrast to FIG. 1, FIG. 2 shows the roof bar 1 in a semi-closed position. As shown in FIG. 2, two bearing eyes or bearing brackets 34 are laterally provided in the region of the second end 33 of the fastening claw 30, for forming a first bearing section 35 with the second profile element 25, which bearing eyes or bearing brackets 34 for example abut with a clearance on the inside of the legs 26 of the second profile element 25 and together rotatably receive a shaft 40. With its shaft ends 41 the shaft 40 is received in first guides 50, which are provided in the legs 26 of the second profile element 25. With this the shaft 40 is received by the profile element 25 so as to be shiftable toward both sides. The first guides are preferably constructed as longitudinal slots 41 and have guideways for the fastening claw 30 and extend obliquely slanted relative to the vehicle's vertical direction z toward the vehicle interior and are provided in a front vehicle-external region of the legs 26. Additionally, the second end 33 of the fastening claw 30 is laterally provided with two pins 37 that engage in a second guide 55 of the support structure 7 or in the legs 26 of the second profile element 25. The second end 33 of the fastening claw 30 is received in the second guide 55 so as to be slidable towards both sides. For this purpose, the second guides 55 are preferably constructed as longitudinal slots 56 and form guideways for the pins 37. The longitudinal slots 56 extend obliquely slanted relative to the vehicle's vertical direction z toward the vehicle interior and are, in contrast to the first guides 50, provided in a rear area of the legs 26 of the second profile element 25 that is closer to a vehicle interior. The second longitudinal slot 56 has a greater longitudinal extent than the first longitudinal slot 51 and may have a bending or slight bend and a small width or can be constructed to be more narrow. Hence, the second end 33 of the fastening claw 30 forms, together with the second guide 55 a second bearing section 37 for the fastening claw 30 on the support structure 5.

Also connected to the shaft 40 is a clamping lever 60, which has two clamping lever bearing eyes or two first clamping lever bearing brackets 61 at its second end 63 situated within the legs 26. The clamping lever 60 is pivotally connected to the fastening claw 30 via the shaft 40. The first clamping lever bearing brackets 61 extend on the inside at a short distance to the bearing brackets 34 of the fastening claw 30. At free first ends 62 of the clamping lever 60, two second clamping lever bearing brackets 64 are provided, which support a clamping lever shaft 65. The clamping lever shaft 65 serves for receiving a first leaf spring end 71 of a spring element in form of a leaf spring 70. Reception of the first leaf spring end 71 can be accomplished through a angled shape of the leaf spring end 71, which for example may be introduced in a slot which is introduced in the clamping lever shaft 65. The leaf spring 70 is supported with its other second leaf spring end 72 on the support structure 7 or on the legs 26 of the second profile element 24, for which a spring shaft 66 is provided between the legs 26. The spring shaft 66 serves for receiving the second leaf spring end 71 of the leaf spring 70. This may occur, analogous to the first leaf spring end 71, through a bended shaping of the second leaf spring end 72, which may, for instance, be introduced in a slot in the leaf spring 66. Approximately in its center the fastening claw 30 has a rectangular opening 38. The opening 38 serves for receiving the first leaf spring end 71 with the clamping lever shaft 65, which in the closed position of the roof bar, enters into the opening with the first clamping lever bearing brackets 61, as is shown in FIGS. 1 and 4.

In contrast to FIGS. 1 and 2, FIG. 3 shows an open position of the roof bar 1, wherein the clamping lever 60 is maximally opened and the leaf spring 70 is relaxed. In this position, the common shaft 40 of the fastening claw 30 and clamping lever 60 is situated within the first guide 50 at the lower ends which are closer to the vehicle roof 2. Similarly, the two pins 37 are situated at the second end 33 of the fastening claw 30 in the second guide 55 or the second longitudinal slots 56 in a lower position close to the vehicle roof 2.

FIG. 4 shows a roof bar 1 in a closed position, wherein the clamping lever 60 is closed and together with the fastening claw 30 and the second clamping lever bearing brackets 6 enters into the opening 38 of the fastening claw 30, snaps with the second clamping lever bearing brackets 64 where it quasi engages behind. In the shown closed state, the lever mechanism is positioned in an over-centre position. This means that a point of maximum clamping force of the leaf spring 70 was overcome during the closing motion and that the leaf spring 70 acts on the fastening claw 30 with a predeterminable clamping force or clamping tension clamping force. The common shaft 40 of the fastening claw 30 and the clamping lever 60 has reached an upper region in the first guide 50 that is closer to the roof bar 5. Similarly, both pins 37 on the second end 33 of the fastening claw 30 have reached the second guide 55 or the two longitudinal slots 56 in a upper position that is closer to the roof bar 5.

According to the invention, the leaf spring 70 forms a further clamping lever for the fastening claw 30 and is able to generate the clamping force required for the attachment of the roof bar 1 to the sidewall rail 10 in the manner of a knee lever. At the same time, tolerances of the sidewall rail 10 can be balanced autonomously so that a constant level of clamping force is provided. The leaf spring 70 is thus incorporated into the clamping mechanism as a component that enables to maintain the clamping force constant over the entire tolerance range. Due to a thoughtful geometric arrangement of clamping lever 60 and leaf spring 70 and due to the arrangement of the fastening claw 30 for rotation and movement in vertical axis 7 of the vehicle in both guides 50, 55 of the support structure 7, a compensating element is provided that enables reducing the operating forces required for depression of the clamping lever 60 so that an easy single-hand operation is possible. The clamping mechanism according to the invention is achieved by two levers, the clamping lever 60 and the leaf spring 70, wherein a sliding in the guideways 50, 55 is possible so that a clamping of the fastening claw 30 on the sidewall rail 10 is achieved. Because the second lever represents the leaf spring 70, a tolerance compensation of the side wall rail 10 is achieved.

For attachment to the vehicle roof 2, the mechanism has to be moved from the open position as shown in FIG. 3 to the closed position shown in FIG. 4. For this the rigid clamping lever 60 is depressed until the fastening claw 30 abuts the side penal frame. Then a form fit or clamping occurs due to the shape tension and spring tension of the leaf spring 70. Due to geometry and construction of this leaf spring 70, which is adjusted to the tolerance of the side panel frame, a constant clamping force is ensured. Due to the geometry of lever and spring as well as the positioning of the guideways, 50, 55, forces and movement of the fastening claw 30 are adjusted so that a simple single-handed operation is ensured. An additional locking device becomes obsolete. In closed position as shown in FIG. 4, the lever mechanism is located in an over-centre position so that a further securing element is not necessary.

What is claimed is:

1. A roof bar for a motor vehicle, comprising:
   a support structure for a roof bar element, said support structure comprising
   a first U-shaped profile element, having two opposing legs connected by a connecting element extending parallel to a roof of the motor vehicle, each of the two opposing legs of the first profile element having a support base,
   a second U-shaped profile element having two further opposing legs connected by a further connecting element extending parallel to the roof of the motor vehicle, each of the further two opposing legs of the second profile element having a further support base, said second profile element being arranged within the first profile element so that the connecting element and the further connecting element abut one another, said first and second profile elements being connected to each other at the connecting element and the further connecting element;
   a fastening claw having a first and a second end, said first end engaging on a side wall rail of a body of the motor vehicle and being pivotally connected to a clamping lever, said fastening claw being guided in a region of the second end in a first guide provided in the further opposing legs of the second U-shaped profile element; and
   a leaf spring, having an end engaging with the clamping lever in a region of a free end of the clamping lever, and having another end supported on the support structure, wherein a movement of the clamping lever towards the fastening claw results in a spring force of the leaf spring, said spring force clamping the fastening claw to the side wall rail.

2. The roof bar of claim 1, further comprising bearing brackets provided on the clamping lever and the fastening claw, said bearing brackets pivotally connecting the fastening claw with the clamping lever, and receiving a shaft slidably received in the first guide.

3. The roof bar of claim 1, further comprising a second guide provided in the support structure, said fastening claw being additionally guided at the second end by the second guide.

4. The roof bar of claim 3, wherein the first and second guides are configured as longitudinal slots respectively provided in the further opposing legs of the second U-shaped profile element.

5. The roof bar of claim 4, wherein the second end of the fastening claw is provided with pins, said pins being received in the longitudinal slots of the second guide.

6. The roof bar of claim 1, further comprising a clamping lever shaft connecting the leaf spring to the clamping lever, said clamping lever shaft being received in bearing brackets provided on the clamping lever.

7. The roof bar of claim 4, further comprising a spring shaft provided between the further opposing legs of the second profile element for connection of the leaf spring to the support structure.

8. The roof bar of claim 2, wherein the fastening claw has an opening for receiving the clamping lever shaft in a depressed state of the clamping lever.

9. The roof bar of claim 1, wherein the support structure further comprises a base element which rests against the vehicle roof, said support base of the first U-shaped profile element being supported on the base element.

* * * * *